US011068064B2

(12) United States Patent
Boblett et al.

(10) Patent No.: US 11,068,064 B2
(45) Date of Patent: Jul. 20, 2021

(54) METHOD OF SELECTING AN APPLICATION TARGET WINDOW IN A USER INTERFACE

(71) Applicant: Tesla, Inc., Palo Alto, CA (US)

(72) Inventors: Brennan Boblett, San Francisco, CA (US); Evan Small, Palo Alto, CA (US); Roy Goldman, Cupertino, CA (US); Michael Fairman, Santa Cruz, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/619,925

(22) Filed: Jun. 12, 2017

(65) Prior Publication Data

US 2017/0277274 A1    Sep. 28, 2017

Related U.S. Application Data

(63) Continuation of application No. 13/789,739, filed on Mar. 8, 2013, now abandoned.

(Continued)

(51) Int. Cl.
*G06F 3/01* (2006.01)
*G06F 3/0488* (2013.01)
(Continued)

(52) U.S. Cl.
CPC ........... *G06F 3/017* (2013.01); *B60G 17/015* (2013.01); *B60J 7/043* (2013.01); *G01C 21/3667* (2013.01);
(Continued)

(58) Field of Classification Search
CPC .. G06F 3/017; G06F 3/04817; G06F 3/04842; G06F 3/0488; G06F 17/00;
(Continued)

(56) References Cited

U.S. PATENT DOCUMENTS 4,866,776 A    9/1989  Kasai et al.
5,083,275 A    1/1992  Kawagoe et al.
(Continued)

FOREIGN PATENT DOCUMENTS

EP    1 028 011    8/2000
EP    2 840 215    2/2015
(Continued)

OTHER PUBLICATIONS

International Application No. PCT/US2013/055595, International Search Report dated Jan. 24, 2014, 5 pages.
(Continued)

*Primary Examiner* — Mandrita Brahmachari
(74) *Attorney, Agent, or Firm* — Knobbe, Martens, Olson and Bear, LLP

(57) ABSTRACT

A method for controlling application windows is provided for use with a graphical user interface (GUI) display which is divided into at least first and second application windows. Various software applications may be launched in the first and second application windows. In order to switch locations of the software applications launched in the first and second application windows the user selects a swap window button, for example by tapping or clicking on a swap window icon on the GUI display.

23 Claims, 3 Drawing Sheets

Related U.S. Application Data

(60) Provisional application No. 61/706,915, filed on Sep. 28, 2012.

(51) Int. Cl.

| | | |
|---|---|---|
| *G01C 21/36* | (2006.01) | |
| *G06F 3/0481* | (2013.01) | |
| *H04S 7/00* | (2006.01) | |
| *G06F 3/0484* | (2013.01) | |
| *B60G 17/015* | (2006.01) | |
| *B60J 7/043* | (2006.01) | |
| *G06F 17/00* | (2019.01) | |

(52) U.S. Cl.
CPC ....... *G01C 21/3697* (2013.01); *G06F 3/0481* (2013.01); *G06F 3/0488* (2013.01); *G06F 3/04817* (2013.01); *G06F 3/04842* (2013.01); *G06F 17/00* (2013.01); *H04S 7/303* (2013.01)

(58) Field of Classification Search
CPC .... B60G 17/015; B60J 7/043; G01C 21/3667; G01C 21/3697; H04S 7/303
See application file for complete search history.

(56) References Cited

U.S. PATENT DOCUMENTS

| | | | |
|---|---|---|---|
| 5,271,063 A | 12/1993 | dAlayer de Costemore dArc | |
| 5,491,795 A | 2/1996 | Beaudet | |
| 5,754,174 A | 5/1998 | Carpenter | |
| 5,790,120 A | 8/1998 | Lozares | |
| 5,933,597 A | 8/1999 | Hogan | |
| 6,043,818 A | 3/2000 | Nakano | |
| 6,204,847 B1 | 3/2001 | Wright | |
| 6,454,341 B2 | 9/2002 | Tolinski | |
| 7,707,514 B2 | 4/2010 | Forstall | |
| 8,095,278 B2 | 1/2012 | Schaaf et al. | |
| 8,239,087 B2 | 8/2012 | Dybalski et al. | |
| 8,434,019 B2 | 4/2013 | Nelson | |
| 9,045,025 B1 | 6/2015 | Greene et al. | |
| 10,019,066 B2 | 7/2018 | Boblett et al. | |
| 10,180,727 B2 | 1/2019 | Boblett et al. | |
| 2001/0043198 A1 | 11/2001 | Ludtke | |
| 2002/0054133 A1* | 5/2002 | Jameson | G06F 3/0481 |
| | | | 715/788 |
| 2003/0070437 A1 | 4/2003 | Hafner et al. | |
| 2005/0105744 A1 | 5/2005 | Lee | |
| 2005/0110229 A1 | 5/2005 | Kimura et al. | |
| 2005/0135636 A1 | 6/2005 | Putti et al. | |
| 2005/0152562 A1 | 7/2005 | Holmi et al. | |
| 2005/0210406 A1 | 9/2005 | Biwer et al. | |
| 2005/0254775 A1 | 11/2005 | Hamilton | |
| 2005/0261822 A1 | 11/2005 | Wako | |
| 2005/0271219 A1 | 12/2005 | Bruelle-Drews | |
| 2005/0280524 A1 | 12/2005 | Boone et al. | |
| 2006/0036962 A1 | 2/2006 | Jobs et al. | |
| 2006/0101352 A1 | 5/2006 | Kohar et al. | |
| 2006/0155429 A1 | 7/2006 | Boone et al. | |
| 2006/0195232 A1 | 8/2006 | Obradovich | |
| 2006/0262935 A1 | 11/2006 | Goose et al. | |
| 2007/0101297 A1 | 5/2007 | Forstall et al. | |
| 2007/0198948 A1* | 8/2007 | Toriyama | A63F 13/005 |
| | | | 715/790 |
| 2007/0234223 A1 | 10/2007 | Leavitt | |
| 2008/0016456 A1 | 1/2008 | Friedland | |
| 2008/0034309 A1 | 2/2008 | Louch | |
| 2008/0207188 A1 | 8/2008 | Ahn | |
| 2008/0297483 A1 | 12/2008 | Kim et al. | |
| 2008/0302014 A1 | 12/2008 | Szczerba et al. | |
| 2009/0122018 A1 | 5/2009 | Vymenets | |
| 2009/0143937 A1 | 6/2009 | Craig | |
| 2009/0144622 A1 | 6/2009 | Evans et al. | |
| 2009/0184480 A1 | 7/2009 | Larsson et al. | |
| 2009/0210110 A1 | 8/2009 | Dybalski et al. | |
| 2009/0313567 A1 | 12/2009 | Kwon | |
| 2010/0176632 A1 | 7/2010 | Alford et al. | |
| 2010/0248788 A1* | 9/2010 | Yook | G06F 3/0481 |
| | | | 455/566 |
| 2010/0313164 A1 | 12/2010 | Louch et al. | |
| 2010/0318266 A1 | 12/2010 | Schaaf et al. | |
| 2011/0037725 A1 | 2/2011 | Pryor | |
| 2011/0082627 A1 | 4/2011 | Small et al. | |
| 2011/0087982 A1 | 4/2011 | McCann et al. | |
| 2011/0087989 A1 | 4/2011 | McCann et al. | |
| 2011/0099512 A1 | 4/2011 | Jeong | |
| 2011/0138295 A1 | 6/2011 | Momchilov et al. | |
| 2011/0138314 A1 | 6/2011 | Mir et al. | |
| 2011/0148626 A1 | 6/2011 | Acevedo | |
| 2011/0166748 A1 | 7/2011 | Schneider | |
| 2011/0282537 A1 | 11/2011 | Yamasaki et al. | |
| 2012/0005602 A1* | 1/2012 | Anttila | G06F 3/1431 |
| | | | 715/761 |
| 2012/0081310 A1 | 4/2012 | Schrock | |
| 2012/0084692 A1 | 4/2012 | Bae | |
| 2012/0110497 A1* | 5/2012 | Gimpl | G06F 1/1616 |
| | | | 715/778 |
| 2012/0131496 A1 | 5/2012 | Goossens et al. | |
| 2012/0311498 A1 | 12/2012 | Kluttz | |
| 2013/0099523 A1 | 4/2013 | Brown et al. | |
| 2013/0132485 A1 | 5/2013 | Thomas et al. | |
| 2013/0179304 A1 | 7/2013 | Swist | |
| 2013/0208190 A1 | 8/2013 | Slothouber et al. | |
| 2013/0305155 A1 | 11/2013 | Yoon | |
| 2014/0093107 A1 | 4/2014 | Vu et al. | |
| 2014/0095023 A1 | 4/2014 | Myggen | |
| 2014/0095029 A1 | 4/2014 | Myggen | |
| 2014/0095030 A1 | 4/2014 | Myggen | |
| 2014/0095031 A1 | 4/2014 | Boblett et al. | |
| 2014/0095997 A1 | 4/2014 | Vu et al. | |
| 2014/0096003 A1 | 4/2014 | Vu et al. | |
| 2014/0096069 A1 | 4/2014 | Boblett et al. | |
| 2017/0302708 A1 | 10/2017 | Monroe et al. | |
| 2018/0095543 A1 | 4/2018 | Myggen | |
| 2018/0314342 A1 | 11/2018 | Boblett et al. | |

FOREIGN PATENT DOCUMENTS

| | | |
|---|---|---|
| JP | 5278469 | 10/1993 |
| JP | 9261800 | 10/1997 |
| KR | 1020120014444 | 2/2012 |
| WO | WO 06/135326 | 12/2006 |

OTHER PUBLICATIONS

Thomas et. al; Methods and Systems for Collaborative Remote Application Sharing and Conferencing; Apr. 12, 2012; U.S. Appl. No. 61/623,131.

Windows7—Adjust the sound:http://windows.microsoft.com/en-us/windows7/adjust-the-sound-level-on-your-computerTutorial on using Microsoft Windows 7 Volume Control—Accessable as early as Aug. 10, 2009.

Windows7—Touch:http://windows.microsoft.com/en-us/windows7/products/features/touchTutorial on using Microsoft Windows 7 with a Touch Screen—Accessable as early as Jun. 27, 2009.

* cited by examiner

METHOD OF SELECTING AN APPLICATION TARGET WINDOW IN A USER INTERFACE

CROSS-REFERENCE TO RELATED APPLICATION

The present U.S. Utility Patent Application claims priority pursuant to 35 U.S.C. § 120 as a continuation of U.S. Utility application Ser. No. 13/789,739, entitled "Method of Selecting an Application Target Window in a User Interface," filed Mar. 8, 2013, which claims priority pursuant to 35 U.S.C. § 119(e) to U.S. Provisional Application No. 61/706,915, entitled "Vehicle User Interface," filed Sep. 28, 2012, both of which are hereby incorporated herein by reference in their entirety and made part of the present U.S. Utility Patent Application for all purposes.

FIELD OF THE INVENTION

The present invention relates generally to a user interface and, more particularly, to a method of selecting the target window in which an application is viewed on a user interface.

BACKGROUND OF THE INVENTION

A conventional computer interface provides a variety of simplified techniques that can be used to select and activate a particular program or application. While the nomenclature and launch features may vary depending upon the operating system, in general these techniques allow a shortcut for the desired program/application to be placed directly on the desktop or within a taskbar or dock located at a screen edge, for example along the top or bottom of the screen. When the user selects a particular program/application, either by tapping (or double tapping) on the program/application icon if the interface is a touch-screen, or selecting the program/application by clicking (or double clicking) on the icon using a mouse, the program/application opens up on the screen. Generally, the program/application will open in a full screen mode, i.e., maximized to cover the entire screen window. In some operating systems, if the program/application was minimized prior to its last closure, when re-opened it will re-open in the same size window as when it was closed. Similarly, if the program/application was minimized prior to its last closure, when re-opened the program/application will typically be located in the same location on the screen as where it was when it was last closed.

When a touch-screen or mouse-controlled user interface is used in a vehicle, the driver is often required to open an application, input data, or otherwise interact with the interface in a rushed manner and while performing other tasks related to driving the car. In this and similar scenarios, conventional application shortcuts may provide the user with insufficient control. Accordingly, what is needed is shortcut technique that easily and quickly allows a user to control the target windows associated with multiple applications, thus minimizing user interaction while still providing the user with the desired level of control. The present invention provides such a user interface.

SUMMARY OF THE INVENTION

A method comprising the steps of: displaying on a touch-screen of a vehicle a graphical user interface (GUI), the GUI including a taskbar region including a plurality of icons that provide shortcut access to applications, a first portion divided into a plurality of application windows, a second portion displaying persistent controls and a swap button; launching and displaying a first software application in a first application window of the plurality of application windows in response to a first user selection of a first icon of the plurality of icons, the first icon corresponding to the first software application; launching and displaying a second software application in a second application window of the plurality of application windows in response to a second user selection of a second icon of the plurality of icons, the second icon corresponding to the second software application; wherein the first application window covers at least half of the first portion of the GUI; and after launching and displaying the first software application and second software application and in response to a third user selection of the swap button, displaying the second software application in the first application window, and displaying the first software application in the second application window.

According to another aspect the first application window is resized to cover more of the touch-screen. According to another aspect the method includes expanding the first application window of the plurality of application windows to cover the first portion, after launching and displaying the first software application in the first application window of the plurality of application windows. According to another aspect the first software application is a navigational system application. According to another aspect the first application window is displayed above the second application window. According to another aspect the applications include a navigation system application, an energy tracking application, a camera application, a phone application, an entertainment system application and a browser application. According to another aspect the persistent controls include at least one of a vehicle settings control, a passenger cabin temperature control, a vehicle seat warmer control, an audio volume control, and a defrost control. According to another aspect the method further comprising displaying the first software application in the first application window and displaying the second software application in the second application window, after displaying the second software application in the first application window and displaying the first software application in the second application window and in response to a fourth user selection of the swap button.

An apparatus for use in a vehicle comprising: a touch-screen; a graphical processing unit (GPU); a central processing unit (CPU); memory; wherein the memory includes instructions for causing the GPU and CPU to display on the touch-screen of the vehicle a graphical user interface (GUI), the GUI including a taskbar region including a plurality of icons that provide shortcut access to applications, a first portion divided into a plurality of application windows, a second portion displaying persistent controls, and a swap button; launch and display a first software application in a first application window of the plurality of application windows in response to a first user selection of a first icon of the plurality of icons, the first icon corresponding to the first software application; launch and display a second software application in a second application window of the plurality of application windows in response to a second user selection of a second icon of the plurality of icons, the second icon corresponding to the second software application; wherein the first application window covers at least half of the first portion of the GUI; and after launching and displaying the first software application and second software application and in response to a third user selection of the swap button display the second software application in the first application window, and display the first software application in the second application window.

A vehicle comprising: a touch-screen; a graphical processing unit (GPU); a central processing unit (CPU); memory; wherein the memory includes instructions for causing the GPU and CPU to display on the touch-screen of the vehicle a graphical user interface (GUI), the GUI including a taskbar region including a plurality of icons that provide shortcut access to applications a first portion divided into a plurality of application windows a second portion displaying persistent controls and a swap button; launch and display a first software application in a first application window of the plurality of application windows in response to a first user selection of a first icon of the plurality of icons, the first icon corresponding to the first software application; launch and display a second software application in a second application window of the plurality of application windows in response to a second user selection of a second icon of the plurality of icons, the second icon corresponding to the second software application; wherein the first application window covers at least half of the first portion of the GUI; and after launching and displaying the first software application and second software application and in response to a third user selection of the swap button display the second software application in the first application window, and display the first software application in the second application window.

A further understanding of the nature and advantages of the present invention may be realized by reference to the remaining portions of the specification and the drawings.

DETAILED DESCRIPTION

The preferred embodiment of the present invention utilizes a large format screen, preferably a touch-screen, which is of sufficient size to allow multiple windows to be opened. It will be appreciated that the screen size required for multiple window viewing depends upon a number of factors, including the user. Thus while the preferred embodiment utilizes a 17-inch touch-screen with a 16:10 aspect ratio, other embodiments may utilize both smaller and larger screen sizes.

In the preferred embodiment, the touch-screen display is used in a vehicle, both as a visual aid and as a means of controlling multiple vehicle subsystems. It should be understood that the invention may also be used in non-vehicle applications (e.g., desktop computer, laptop computer, tablet, smartphone, etc.). If used within a vehicle compartment, preferably the display is mounted within the vehicle's central console, thus providing access to the data on the screen as well as the displayed system controls to both the driver and the passenger seated in the passenger front seat.

Figure 1:
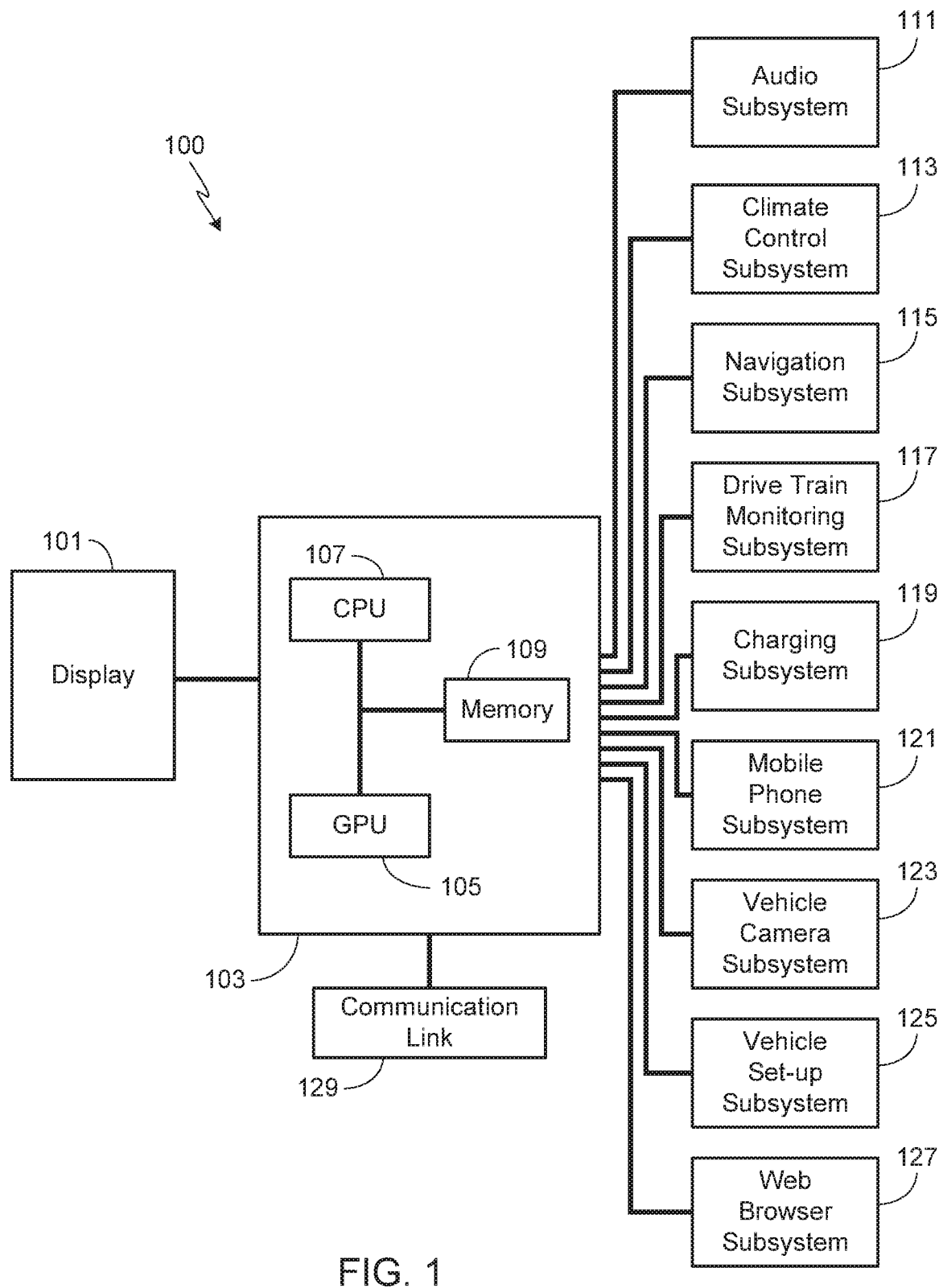
FIG. 1 provides a block diagram of an exemplary interface system that may be used with the present invention.

FIG. 1 provides a block diagram of an exemplary interface system 100 that includes touch-screen 101 and is suitable for use with the invention. In system 100, display 101 is coupled to a system controller 103. Controller 103 includes a graphical processing unit (GPU) 105, a central processing unit (CPU) 107, and memory 109. CPU 107 and GPU 105 may be separate or contained on a single chip set. Memory 109 may be comprised of flash memory, a solid state disk drive, a hard disk drive, or any other memory type or combination of memory types. Controller 103 is coupled to a variety of different vehicle subsystems, including the vehicle subsystem controls and vehicle subsystem monitors that are to be accessed and/or viewed on display 101. Exemplary subsystems include audio subsystem 111, climate control subsystem 113, navigation subsystem 115, drive train monitoring subsystem 117, charging subsystem 119, mobile phone subsystem 121, vehicle camera subsystem 123, vehicle set-up subsystem 125 and web browser subsystem 127. Vehicle set-up subsystem 125 allows general vehicle operating conditions to be set, conditions such as seat position, moon roof or sun roof position/operation, internal and external lighting, windshield wiper operation, etc. Preferably a mobile telecommunications link 129 is also coupled to controller 103, thereby allowing the controller to obtain updates, interface configuration profiles, and other data from an external data source (e.g., manufacturer, dealer, service center, web-based application, remote home-based system, etc.). Mobile telecommunications link 129 may be based on any of a variety of different standards including, but not limited to, GSM EDGE, UMTS, CDMA2000, DECT, and WiMAX.

Figure 2:
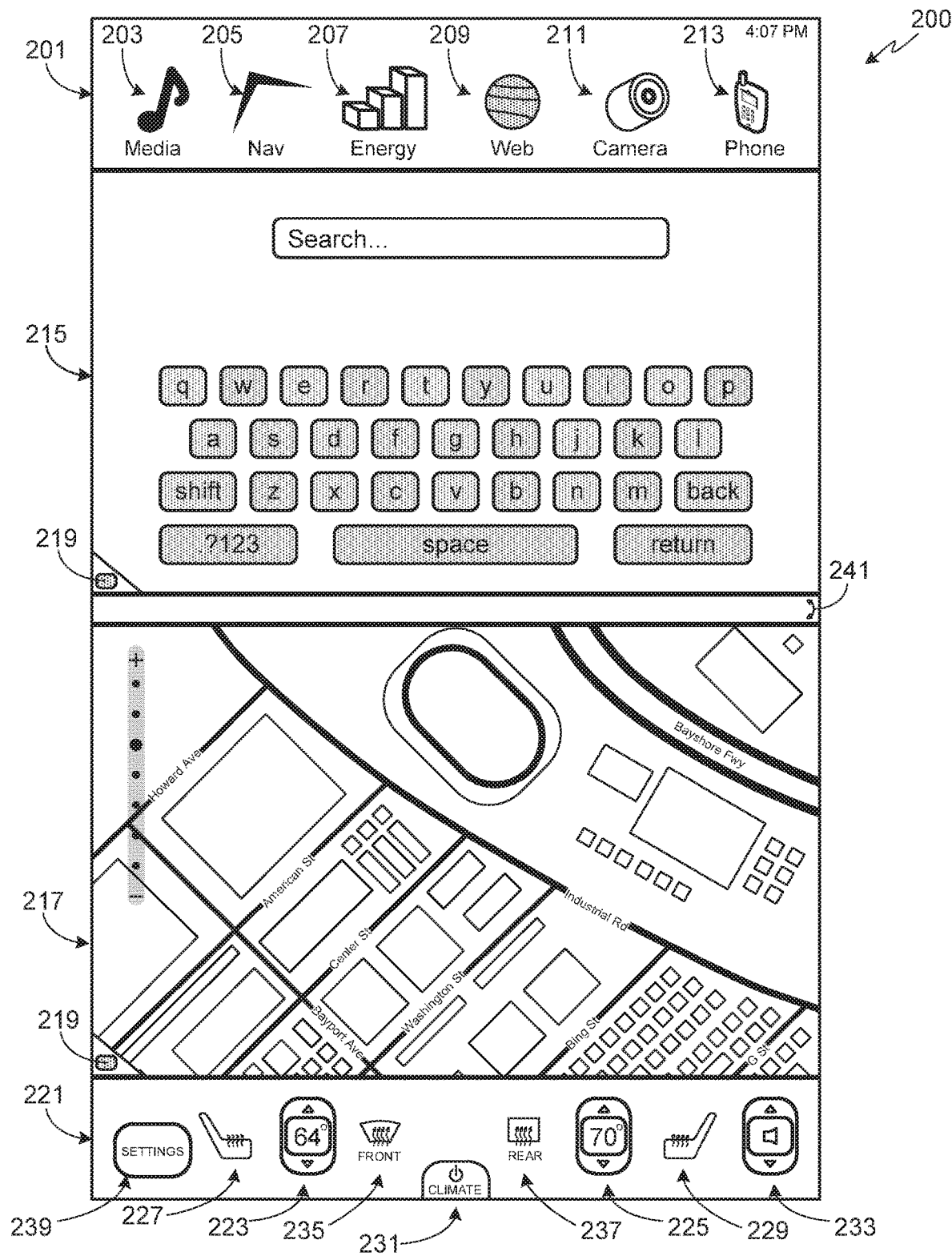
FIG. 2 illustrates an exemplary GUI screen.

FIG. 2 provides an exemplary screen 200. It should be understood that the icons and information shown on this and subsequent graphical user interface (GUI) screens is for illustration purposes only and that the invention is equally applicable to screens utilizing a different format, size or configuration as well as interfaces utilizing different operating systems, different programs/applications, etc. Furthermore, it should be understood that the terms "program", "application" and "program/application" are used interchangeably throughout this specification.

A GUI display configured for use with the invention, regardless of whether the display is a touch-screen as preferred or a non-touch-screen, preferably includes a dedicated taskbar region 201. Although taskbar region 201 is shown positioned at the top of GUI screen 200, it will be appreciated that it could be located elsewhere (e.g., at the bottom of the screen, along a side of the screen, etc.). Within taskbar 201 are icons representative of the applications that provide the user with shortcut access to each of the designated applications, for example applications that control various vehicle subsystems. In one embodiment, the application shortcuts located within the taskbar are configured by a third party (e.g., the system or vehicle manufacturer) while in another embodiment the application shortcuts located within the taskbar are configured by the end user. Typically the shortcuts in taskbar 201 are for those applications for which frequent access is desired. In the exemplary GUI screen the illustrated shortcuts are for a media/audio/entertainment system application (i.e., media icon 203), a navigation system application (i.e., navigation icon 205), an energy tracking application that monitors battery usage/charging (i.e., energy icon 207), a browser application (i.e., web icon 209), a camera application for a back-up and/or forward view camera (i.e., camera icon 211), and a mobile/cell phone interface application (i.e., phone icon 213).

In accordance with the invention, a portion of the GUI display screen is divided into two or more windows that are used to display the selected applications. In the exemplary screen 200, two windows are shown with upper window 215 displaying web browser application 209 and lower window 217 displaying a map selected via navigation interface application 205. In the preferred embodiment, a selected window may be expanded to cover all of the windows (e.g., windows 215 and 217), a particularly useful feature when either the web browser or the navigation system is selected. In the illustrated embodiment the user can switch between a full-screen and a half-screen mode for a particular application by tapping, or clicking, on button 219 within the lower left hand corner of the affected window. It will be appreciated that button 219 can be located elsewhere on display screen 200, or an alternate means may be used to toggle between full-screen and half-screen display modes for a particular application window. Additionally, in some embodiments the user can resize windows, for example allowing the lower window to cover 75% of the available display screen while the upper window covers only 25% of the available display screen.

In the illustrated GUI a portion 221 of the screen is used for persistent controls that remain on the display screen regardless of the applications being displayed on the screen. These persistent controls may be selected based on the need for frequent access (e.g., temperature controllers 223/225, seat warmers 227/229, climate controller 231 and audio volume controller 233, etc.) or for safety (e.g., front defroster controller 235, rear defroster controller 237, etc.). In the exemplary screen, a "settings" button 239 is also shown, which provides the user with instant access to the various vehicle settings (e.g., lights, sunroof control, etc.). The persistent controls may be configured by the user, the system/vehicle manufacturer, or by a third party.

In accordance with the invention, the user is able to easily and quickly swap the positions of the software applications within the upper and lower windows, thus allowing the user to customize the display to meet current preferences. For example, during a drive the user may have selected the web browser application 209 in order to use an internet radio service. During the majority of the drive the internet radio service may be displayed on the lower window (i.e., lower window 217) while a navigation screen, selected via navigation application 205, may be displayed on the primary viewing region of the screen (i.e., upper window 215). At some point during the drive the user may wish to switch positions of these two application windows, for example in order to position the web browser in the upper viewing window 215 while using the web browser to look-up an address, get additional information about the destination, etc. According to the invention, in order to swap application window locations, the user simply taps, or clicks, on button 241 (represented by a swap window icon on the display), where tapping refers to selecting button 241 by touching soft-button 241 on a touch-screen and clicking refers to selecting button 241 using a mouse controller or similar input device with either a touch-screen or non-touch screen display.

In the preferred and illustrated embodiment, window swap button 241 is located between windows 215 and 217, or adjacent to the intersection of windows 215 and 217, thus intuitively linking the button's location with its function. The use of a double-ended arrow icon for button 241 provides the user with a visual indicator as to the functionality of button 241. Note that the inventors clearly envision button 241 having a different look/icon, for example a button with the word "swap" and a double-ended arrow. Similarly, the inventors envision that button 241 may be located elsewhere on the display 200, for example within portion 221 of the screen.

Figure 3:
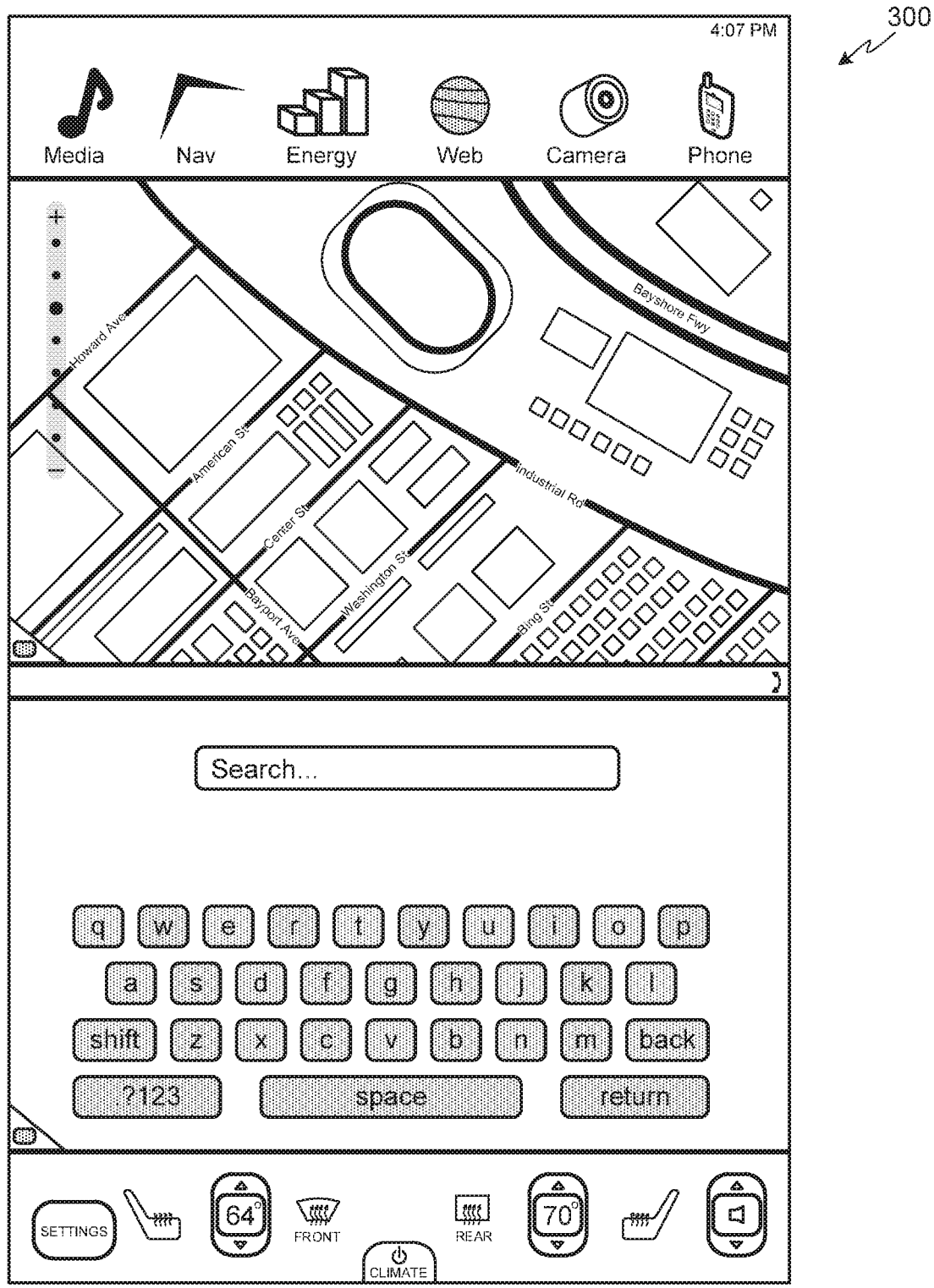
FIG. 3 illustrates the exemplary GUI screen of FIG. 2 after a user has selected the swap application window button, thereby swapping application locations on the GUI screen.

When a user activates button 241, for example by tapping or clicking the button, the application windows switch positions as previously noted. Thus if the user is viewing display 200 shown in FIG. 2 and taps or otherwise selects button 241, the applications would switch positions as illustrated in GUI screen 300 shown in FIG. 3. Then, if the user selects button 241 again, the two windows would switch positions back to the positions shown in FIG. 2. It will be appreciated that this technique of providing a simple means of swapping application windows may be used with any two applications, e.g., media/audio control interface, phone interface, etc.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method comprising the steps of:

displaying on a touch-screen of a vehicle a graphical user interface (GUI), the GUI including:

a taskbar region including a fixed plurality of icons in a fixed order independent of user input that provide shortcut access to a plurality of applications;

a first portion divided into a plurality of application windows;

a second portion displaying a set of controls related to the vehicle as a static display, wherein the displayed set of controls of the static display is displayed independent of selected and displayed applications, and wherein the displayed set of controls of the static display is related to at least one control associated with the operation of the vehicle and is displayed in an order independent of user input;

at least one resize button, wherein each application window includes a single resize button displayed within the application window at a same location within each application window, wherein the resize button is used to toggle between a first display mode and a second display mode that resize the application window; and a swap button displayed at a location either between a first application window and a second application window, or adjacent to an intersection of the first application window and the second application window, wherein the swap button provides a visual indication linking the first application window and the second application window, the visual indication having a location associated with at least one of the first application window or the second application window;

launching and displaying a first software application in the first application window of the plurality of application windows in response to a first user selection of a first icon of the plurality of icons, the first icon corresponding to the first software application and the first application window having a first size;

launching and displaying a second software application in the second application window of the plurality of application windows in response to a second user selection of a second icon of the plurality of icons, the second icon corresponding to the second software application and the second application window having a second size;

after launching and displaying the first software application and second software application and in response to a third user selection of the swap button:
  displaying the second software application in the first application window; and
  displaying the first software application in the second application window.

2. The method of claim 1, wherein the first application window is resized to cover greater than half of the touch-screen.

3. The method of claim 1, wherein the second application window is resized to cover greater than half of the touch-screen.

4. The method of claim 1, wherein the first software application is a navigational system application.

5. The method of claim 4, wherein launching and displaying a first software application in a first application window includes launching and displaying the first application window above the second application window.

6. The method of claim 1, wherein the applications include a navigation system application, an energy tracking application, a camera application, a phone application, an entertainment system application and a browser application.

7. The method of claim 1, wherein the controls of the static display include a vehicle settings control, a passenger cabin temperature control, a vehicle seat warmer control, an audio volume control, and a defrost control.

8. The method of claim 1, further comprising displaying the first software application in the first application window and displaying the second software application in the second application window, after displaying the second software application in the first application window and displaying the first software application in the second application window and in response to a fourth user selection of the swap button.

9. The method of claim 1, wherein the swap button is alternatively displayed within the second portion of the GUI.

10. The method of claim 1, wherein the first size and second size are different from each other.

11. The method of claim 1, wherein the second application window is resized to cover greater than half of the touch-screen and less than an entire touch screen in response to a user action.

12. An apparatus for use in a vehicle comprising:
a touch-screen;
a graphical processing unit (GPU);
a central processing unit (CPU);
memory;
wherein the memory includes instructions for causing the GPU and CPU to:
  display on the touch-screen of the vehicle a graphical user interface (GUI), the GUI including:
    a taskbar region including a fixed plurality of icons in a fixed order independent of user input that provide shortcut access to a plurality of applications;
    a first portion divided into a plurality of application windows;
    a second portion displaying a set of controls related to the vehicle as a static display, the displayed set of controls of the static display being displayed independent of selected and displayed applications, wherein the displayed set of controls of the static display is related to the vehicle and is displayed in an order independent of user input;
    at least one resize button, wherein each application window includes a resize button displayed within the application window at a same location within each application window, wherein the resize button is used to toggle between a first display mode and a second display mode that resize the application window; and
    a swap button displayed at a location either between a first application window and a second application window, or adjacent to an intersection of the first application window and the second application window, wherein the swap button provides a visual indication linking the first application window and the second application window, the visual indication having a location associated with at least one of the first application window or the second application window;
  launch and display a first software application in the first application window of the plurality of application windows in response to a first user selection of a first icon of the plurality of icons, the first icon corresponding to the first software application;
  launch and display a second software application in the second application window of the plurality of application windows in response to a second user selection of a second icon of the plurality of icons, the second icon corresponding to the second software application;
  subsequent to the launch and display of the first software application and second software application, receive a third user selection of the swap button:
    display the second software application in the first application window; and
    display the first software application in the second application window.

13. The apparatus of claim 12, wherein the memory includes instructions for further causing the GPU and CPU to resize the first application window to cover greater than half of the touch-screen.

14. The apparatus of claim 12, wherein the memory includes instructions for further causing the GPU and CPU to resize the second application window to cover greater than half of the touch-screen and less than an entire touch-screen.

15. The apparatus of claim 12, wherein the first software application is a navigational system application.

16. The apparatus of claim 15, wherein the memory includes instructions for further causing the GPU and CPU to display the first application window above the second application window.

17. The apparatus of claim 12, wherein the applications include at least one of a navigation system application, an energy tracking application, a camera application, a phone application, an entertainment system application and a browser application.

18. The apparatus of claim 12, wherein the controls of the static display include at least one of a vehicle settings control, a passenger cabin temperature control, a vehicle seat warmer control, an audio volume control, and a defrost control.

19. The apparatus of claim 12, wherein the memory includes instructions for further causing the GPU and CPU to, subsequent to displaying the second software application in the first application window and displaying the first software application in the second application window, display the first software application in the first application window and display the second software application in the second application window in response to a fourth user selection of the swap button.

20. A vehicle comprising:
a touch-screen;
a graphical processing unit (GPU);
a central processing unit (CPU);
memory;
wherein the memory includes instructions for causing the GPU and CPU to:
  display on the touch-screen of the vehicle a graphical user interface (GUI), the GUI including:
    a taskbar region including a fixed plurality of icons in a fixed order independent of user input that provide shortcut access to a plurality of applications;
    a first portion divided into a plurality of application windows;
    a second portion displaying a set of controls related to the vehicle as a static display of icons, the displayed set of controls of the static display being displayed independent of selected and displayed applications, wherein the displayed set of controls of the static display is related to the vehicle and is displayed in an order independent of user input;
    at least one resize button, wherein each application window includes a resize button displayed within the application window at a same location within each application window, wherein the resize button is used to toggle between a first display mode and a second display mode that resize the application window; and
    a swap button displayed at a location either between a first application window and a second application window, or adjacent to an intersection of the first application window and the second application window, wherein the swap button provides a visual indication linking the first application window and the second application window, the visual indication having a location associated with at least one of the first application window or the second application window;
  launch and display a first software application in the first application window of the plurality of application windows in response to a first user selection of a first icon of the plurality of icons, the first icon corresponding to the first software application;
  launch and display a second software application in the second application window of the plurality of application windows in response to a second user selection of a second icon of the plurality of icons, the second icon corresponding to the second software application;
  subsequent to the launch and display of the first software application and second software application, receive a third user selection of the swap button:
    display the second software application in the first application window; and
    display the first software application in the second application window.

21. The vehicle of claim 20, wherein the memory includes instructions for further causing the GPU and CPU to resize the first application window to cover greater than half of the touch-screen.

22. The vehicle of claim 20, wherein the memory includes instructions for further causing the GPU and CPU to resize the second application window to cover greater than half of the touch-screen and less than an entire touch-screen.

23. The vehicle of claim 20, wherein the vehicle further comprises a navigation subsystem and wherein the first software application is a navigational system application.

* * * * *